May 7, 1968

R. H. O'KANE 3,381,932

PRESSURE DIFFERENTIAL VALVE

Filed Feb. 16, 1967

INVENTOR.
RICHARD H. O'KANE
BY Naylor & Neal
ATTORNEYS

May 7, 1968 R. H. O'KANE 3,381,932
PRESSURE DIFFERENTIAL VALVE
Filed Feb. 16, 1967 2 Sheets-Sheet 2

INVENTOR.
RICHARD H. O'KANE
BY Naylor & Neal
ATTORNEYS

United States Patent Office 3,381,932
Patented May 7, 1968

3,381,932
PRESSURE DIFFERENTIAL VALVE
Richard H. O'Kane, 16045 Highway 128,
Calistoga, Calif. 94515
Continuation-in-part of application Ser. No. 414,272,
Nov. 27, 1964. This application Feb. 16, 1967, Ser.
No. 616,685
7 Claims. (Cl. 251—30)

ABSTRACT OF THE DISCLOSURE

A solenoid operable pressure differential valve having a tubular body with a solenoid winding extending around a portion of its length, a pair of conduit connectors communicating with its interior, and magnetic primary and pilot valve mandrels slidably disposed within its interior. When the valve is in closed condition, the pilot valve mandrel rests against the primary valve mandrel in a position within the field of magnetic flux of the winding and the primary valve mandrel is sealingly interposed between the connectors in a position isolated from the field of magnetic flux of the winding. In operation, upon activation of the winding, the pilot valve mandrel is moved under the influence of the winding to a position creating a pressure differential across the primary valve mandrel. This differential functions to move the primary valve mandrel into the field of magnetic flux of the winding and open the connectors to fluid communication.

This application is a continuation-in-part of my copending application Ser. No. 414,272, filed Nov. 27, 1964, and now abandoned, entitled, Auxiliary Lubrication System and Valve Therefor.

The present invention relates to a pilot controlled fluid actuated pressure differential valve and, more particularly is directed to such a valve ideally suited for employment in an auxiliary lubrication system for an engine having a pressure lubrication system.

In the prior art, various types of pilot controlled fluid actuated pressure differential valves have been provided. These valves typically employ a main valve comprising a diaphram or slidable valve mandrel and a pilot valve controllably associated with the main valve for activation by a solenoid. The present invention is concerned with such valves wherein the main valve comprises a slidable valve mandrel.

The pilot controlled pressure differential valves in the prior art employing main valves comprising a slidable valve mandrel suffer several disadvantages. One of the primary disadvantages is that the solenoid operators for these valves are typically required to impart lifting force to both the pilot and main valve mandrels. As a result, a relatively large solenoid is required. Another disadvantage is that the main valve mandrel does not move completely clear of the flow path it is designed to open. This results in the requirement of a rather complicated valve housing to permit adequate flow. Still another disadvantage is that the main valve mandrel moves through a relatively short stroke and, thus, delay in closing of the mandrel upon creation of a pressure differential thereacross is extremely limited. Such delay, as will become apparent from the subsequent discussion, is often desirable. Yet another disadvantage is that the valves chatter due to insufficient pressure differential across the main valve mandrel upon opening of the pilot valve mandrel. These disadvantages are all frequently accompanied by innumerable other disadvantages which, in large part, result from their presence.

In summary, the present invention comprises a pilot controlled fluid actuated pressure differential valve wherein the valve functions are effected by independently slidable main and pilot valve mandrels. The pilot valve mandrel is disposed within a solenoid for selectve activation thereby to create a pressure differential across the main valve mandrel. The main valve mandrel is disposed so that pressure differential thereacross effects its initial lifting and, once lifted, the solenoid moves it to a position removed from the flow path designed to be opened by the valve.

The primary object of the invention is to provide a pressure differential valve capable of overcoming the aforementioned disadvantages of the prior art valves.

Another object of the invention is to provide a pressure differential valve ideally suited for incorporation into an auxiliary lubrication system for an engine having a primary pressure lubrication system.

Other objects and advantages of the invention will become apparent from the following detailed description and accompanying drawings wherein.

Figure 2:
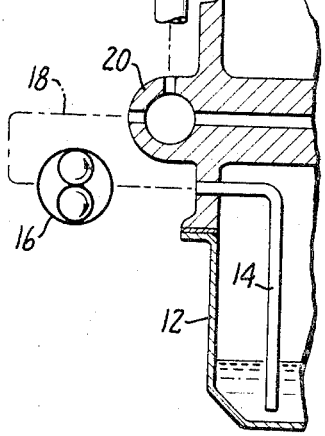
FIG. 2 is an elevational view, partially in section, illustrating the valve of the invention and the internal components thereof.
Figure 2:
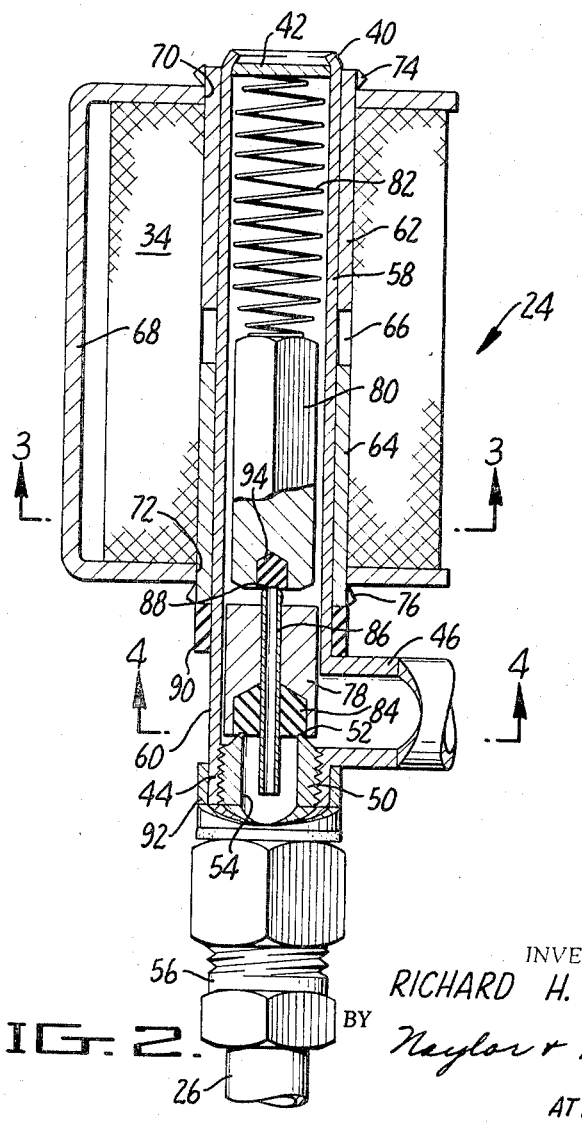
Figure 3:
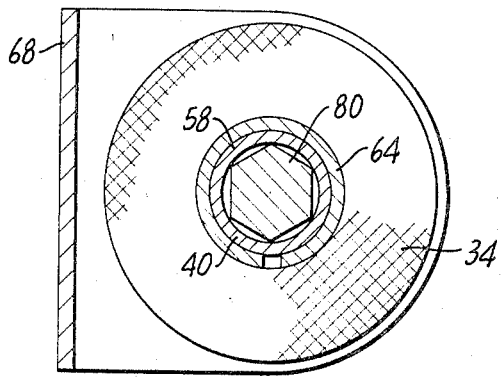
Figure 4:
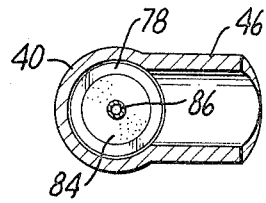
Figure 5:
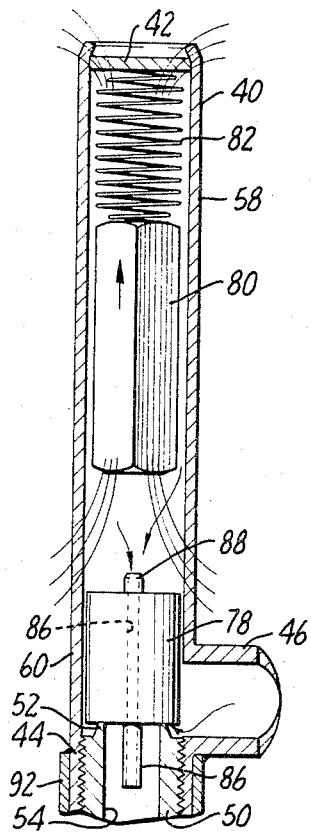
Figure 6:
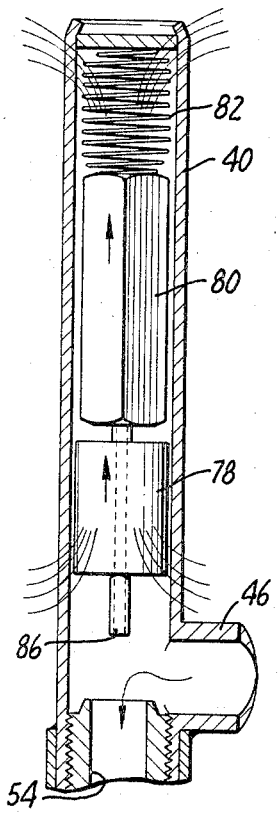
Figure 7:
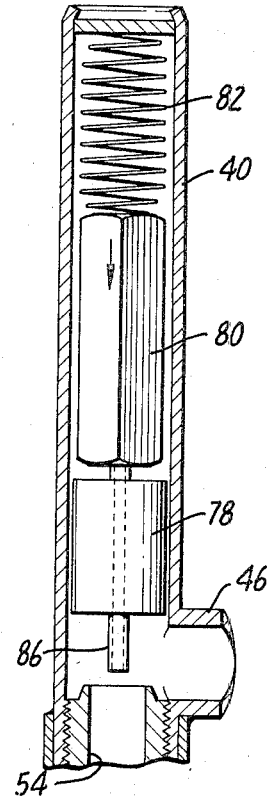

FIGS. 3 and 4 are sectional views taken on the planes designated by lines 3—3 and 4—4, respectively, of FIG. 2; and FIGS. 5, 6 and 7 are partial sectional elevational views sequentially illustrating the operation of the valve during initial opening, full opening and closing, respectively.

Figure 1:
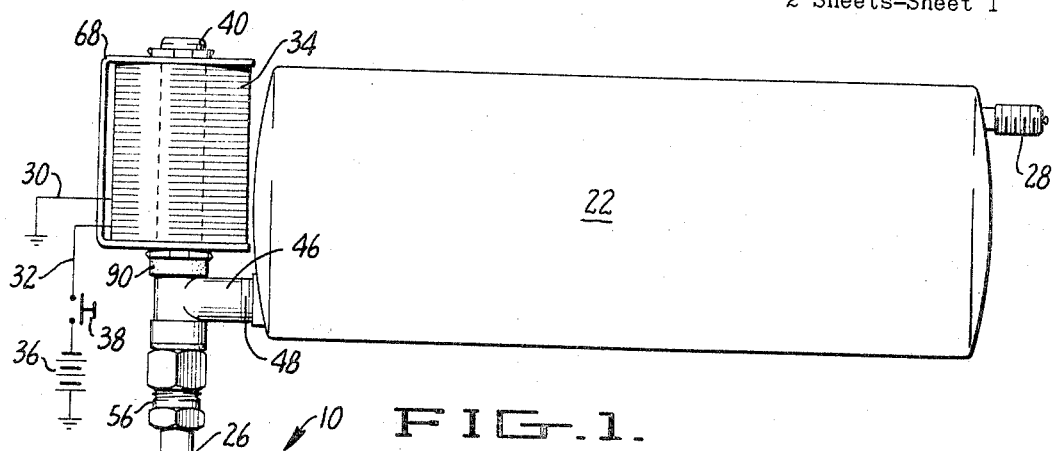
FIG. 1 is an elevational view, partially in section, diagrammatically illustrating the valve of the present invention incorporated into an auxiliary lubrication system for an engine provided with a pressure lubrication system.

Referring now specifically to FIG. 1 of the drawings, the numeral 10 therein designates an engine provided with an oil reservoir pan 12 and a primary pressure lubrication system adapted to withdraw oil from the pan and supply it to components of the engine under pressure. As schematically illustrated, the lubrication system comprises a withdrawal conduit 14 extending into the pan and leading therefrom to a pump 16. The pump 16 discharges through a conduit 18 into a main oil boss 20 provided on the engine. It is to be understood that the engine 10 and primary lubrication system therefor are of conventional structure and that oil from the boss 20 is directed to various components of the engine.

FIG. 1 also illustrates an auxiliary lubrication system for the engine 10 comprising a closed tank 22 adapted to contain oil under a pressure head of gas; a solenoid operated pressure differential valve 24 connected to the tank 22 to selectively charge and discharge oil therefrom; and, a conduit 26 extending in fluid communication between the main oil boss 20 and the valve 24. The tank 22 is provided with a check valve 28 of the automobile tire type through which air may be selectively introduced or discharged. The valve 28 may be employed to establish a predetermined pressure head in the tank 22 and, when the valve 24 is open, to purge the primary lubrication system of the engine 10. A pair of electrical leads 30 and 32 are connected to the solenoid winding of the valve 24, designated by the numeral 34, to selectively energize the winding to effect opening of the valve. In the arrangement schematically illustrated, the lead 30 is connected to ground and the lead 32 is connected to a battery 36 which, in turn, is connected to ground. The circuit through the leads 30 and 32 is normally maintained in open condition by a push-button switch 38 interposed in the lead 32. It is through closing of the switch 38 that the solenoid winding 34 is selectively energized. Although the switch 38 is of the push-button type, it is to be understood that the electrical control circuit for the solenoid winding 34 may be wired for operation by any number of alternative switching devices. For example, it would be possible to wire the circuit for operation by the ignition switch of the engine or for operation responsive to the oil pressure indicator of the engine. The latter arrangement is particularly desirable because it assures the auxiliary lubrication system will only be activated when the primary oil pressure system of the engine is in a low pressure condition.

The internal construction of the valve 24 is illustrated in FIGS. 1, 2 and 3. From these figures, it can be seen that the valve comprises, as a basic element, a tubular body 40 of generally T-shaped configuration closed at one end by a barrier 42. The body 40 is fabricated of a non-magnetic material and is provided at the distal end thereof opposite the barrier 42 with an internally threaded portion 44. The T-leg of the body, designated by the numeral 46, is disposed immediately adjacent the portion 44 and provided with external threads 48 (see FIG. 1) at its distal end. Although the threads 48 are illustrated as being received in an opening therefor in the tank 22, it is to be understood that these threads may be employed for connecting the leg 46 to any desired fluid conduit. The portion 44 threadably receives an externally threaded conduit coupling fitting 50 having an annular valve seat 52 formed on the distal end thereof. The portion 44 and and fitting 50 are proportioned so as to dispose the seat 52 in a position extended slightly across the opening of the leg 46 into the main portion of the body 40. The end of the fitting 50 opposite the seat 52 is of conventional coupling configuration and includes an internally threaded passage (not illustrated) communicating with the opening, designated by the numeral 54, extending through the fitting. The internally threaded opening of the fitting is designed to receive a mating fitting 56 disposed on the end of a conduit, such as the conduit 26 illustrated in FIG. 1.

The main portion of the body 40 includes a first length 58 extending through the solenoid winding 34 and a second length 60 extending between the winding and the distal end of the portion 44. A flux guide of magnetic material for the winding 34 is received around the length 58. This guide comprises a pair of opposed sleeves 62 and 64 concentrically received around the length 58 to define a flux gap 66 and a generally U-shaped member 68 having axially aligned openings 70 and 72 therein received around the sleeves 60 and 62, respectively. Flared out abutments 74 and 76 formed on the sleeves 21 and 64, respectively, seat against the openings in the member 68 to control the width of the gap 66. Through provision of this flux guide arrangement, the flux of the solenoid 34 is concentrated at the gap 60 and straying of the flux field laterally to the length 60 is, at least in large part, prevented.

The main portion of the body 40 has a main or primary valve mandrel 78 and a pilot valve mandrel 80 slidably received therein. The mandrels 78 and 80 are formed of magnetic material and, upon de-energizing of the winding 34, are normally urged to the closed condition illustrated in FIG. 2 by a compression coil spring 82 interposed between the barrier 42 and the end surface of the mandrel 80 opposed to the barrier. The primary valve mandrel 78 is of cylindrical exterior configuration and has a resilient annular valve disc 84 of neoprene or the like received in one end thereof, for seating engagement with the valve seat 52. The mandrel 78 also has a pilot conduit 86 fixed thereto and extending axially therethrough. The conduit 86 lends support to the valve disc 84 and is designed to extend from the valve disc and through the valve seat 52 to an appreciable extent during initial lifting of the valve disc from the seat. As will become apparent from the subsequent discussion, the latter characteristic facilitates the creation of a pressure differential across the ends of the pilot conduit 86 during initial lifting of the primary valve mandrel. The end of the conduit 86 opposite that extending through the valve disc 84 extends laterally of the mandrel 78 to define a crown valve seat 88.

The second length 60 is maintained laterally of the flux field of the solenoid 34 by annular spacer 90 of non-magnetic material. The spacer 90 is received around the length 60 and interposed between the leg 46 and sleeve 64. The internally threaded portion 44 of the second length 60 is reinforced by an annular sleeve 92 fixed to and extending around its outer surface. The sleeve 92 is provided to prevent deformation of the portion 44 upon threading of the fitting 50 thereinto. Employment of the sleeve is desirable, since the entire tubular body 40 is typically fabricated of a relatively soft material, such as brass.

The primary valve mandrel 78 is of such a length that, when it is seated with the valve seat 52 as illustrated in FIG. 2, it terminates short of the first length 58 having the windings 34 therearound. Thus, when so seated, the mandrel 78 is not subjected to the flux influence of the solenoid winding 34. In addition to having this length characteristic, the mandrel 78 is of a cylindrical cross section sufficient to have a predetermined limited clearance with the interior of the body 40. This clearance is selected so that fluid flow around the mandrel 78 will be restricted to a predetermined degree which is greater than the degree to which flow is restricted through the pilot conduit 86. The area of the pilot conduit 86 is also related to the area of the opening 54 in the valve seat 52 in a ratio which creates a mechanical advantage during opening of the valve when the fluid pressure in the leg 46 exceeds that in the fitting 50. This "mechanical advantage" in effect means that the force required to lift the pilot valve mandrel 80 from the crown seat 88 is less than that which would be required to lift the primary valve mandrel 78 from the seat 52. It corresponds to the ratio of the respective interior areas of the opening 54 and pilot conduit 80.

The pilot valve mandrel 80 has a resilient valve disc 94 of neoprene or the like mounted therein for seating engagement with the crown seat 88. The mandrel is proportioned so that, when seated with the crown seat 88, the end thereof opposite the disc 94 is disposed centrally of the length of the flux guide gap 66. Thus, when the solenoid winding 34 is energized, the mandrel 80 is subjected to concentrated flux pulling forces thereby. The pilot valve mandrel 80 is also designed to substantially eliminate the occurrence of pressure differentials thereacross, with the exception of a pressure differential created at the valve disc 94 when it is seated with the crown seat 88. In the exemplary embodiment illustrated, this provision is made by forming the pilot mandrel 80 of hexagonal cross section so that flow therearound is substantially unrestricted.

The operation of the auxiliary lubrication system and the valve 24 incorporated thereinto will now be described with respect to the sequential illustrations of FIGS. 5, 6 and 7. Although the description is keyed to the operation of the valve in the auxiliary lubrication system, it should be understood that the valve would operate in a corresponding manner where employed in other fluid systems wherein it is subjected to similar pressure differentials.

*Operation*

When the auxiliary lubrication system is installed as illustrated in FIG. 1 and the solenoid winding 34 is de-energized, running of the engine will initially cause a portion of the lubricating oil in the main oil boss 20 to be forced into the tank 22. During this initial function, the fluid pressure generated by the pump 16 functions to lift the primary valve mandrel 78 from the seated condition illustrated in FIG. 2 in check valve-like fashion. The lifting of the valve mandrel 78, in turn, permits oil to flow into the tank 22 until the gas pressure therein equalizes with the oil pressure in the main oil boss 20. Upon the latter occurrence, the pressure around the primary valve mandrel 78 is equalized and, thus, the mandrel is forced to the closed condition illustrated in FIG. 2 by the spring 82. The latter closing operation is retarded since the pilot valve mandrel 80 is seated with the crown seat 88 and, thus, the only way that replacement fluid may reach the upper side of the primary valve mandrel 78 is through the small clearance between the mandrel and the body 40. This delayed closing operation is illustrated in FIG. 7 and, as will become more apparent subsequently, is advantageous during repeated operation of the valve, since it maintains the valve in open condition for a relatively long period while oil pressure in the engine is building up.

The compressive force of the spring 82 is sufficient to maintain the pilot valve mandrel 80 in seated condition against the crown seat 88 during the aforedescribed check valve-like operation of the valve. Thus, equalization of pressure on opposite sides of the primary valve mandrel 78 prior to complete opening of the valve during the check valve function is prevented.

Upon closing of the primary valve mandrel 78 under the influence of the spring 82, oil is trapped in the tank 22 under a pressure head of gas equal to the normal operating oil pressure of the primary lubrication system in the engine 10. This condition is maintained during continuous running of the engine and after termination of this running. Thus, even after the engine 10 is stopped and oil pressure in the primary lubrication system thereof is depleted, oil in the tank 22 is maintained under pressure.

After the engine 10 is stopped, oil under pressure may be supplied to the primary lubrication system thereof from the tank 22 by energizing the solenoid winding 34. This function is accomplished by closing the switch 38 and is typically effected immediately prior to starting of the engine. Energizing of the coil 34 immediately effects movement of the pilot valve mandrel 80 as depicted in FIG. 5. Specifically, the flux of the solenoid winding, schematically illustrated by the curved lines leading into the body 40 in FIGS. 5 and 6, pulls the mandrel 80 from seated engagement with the crown seat 88 to a position centered relative to the flux gap 66. The direction of movement of the mandrel to this position is designated by the arrow line on the mandrel in FIG. 5.

During initial movement of the pilot mandrel 80 responsive to energizing of the solenoid winding 34, the flux force imparted to the mandrel overcomes the force imparted thereto by differential pressure across the crown seat 88. The latter force is relatively small, however, because of the very limited area of the passage in the pilot conduit 86. Thus, the solenoid winding 34 need only have a relatively small current draw. It is noted that the flux field of the solenoid winding 34 is external of the valve mandrel 78 when the mandrel is engaged with the seat 52 and that, accordingly, the solenoid is not required to lift the primary valve mandrel 78 from the seat 52.

After the pilot valve mandrel 80 is initially lifted to the position illustrated in FIG. 5 by the solenoid winding 34, the differential in pressure between the upper and lower ends of the pilot conduit 86 causes oil to flow into the conduit, as diagrammatically illustrated by the arrow lines leading thereinto, to equalize the pressure condition in the valve body 40 above the mandrel 78 with that in the opening 54 below the mandrel. Due to the relatively unrestricted flow characteristics of the conduit 86, as compared with the flow path around the mandrel 78, a condition is created where the pressure above the mandrel 78 is less than that around its lower external portion. The latter pressure is diagrammatically illustrated by the arrow line leading to this lower portion from the leg 46.

The pressure differential condition thus created across the mandrel 78 functions to lift the mandrel from the seat 52 and into the flux influence of the solenoid winding 34. This lifting function is enhanced by the portion of the conduit 86 extending through the valve seat 52 which, in effect, maintains the lower end of the conduit at a low pressure condition during initial lifting of the mandrel 78. After the mandrel 78 is lifted into the flux influence of the solenoid 34, this influence moves the mandrel 78 into a position wherein the crown seat 88 abuts with the valve disc 94 of the pilot valve 80. Upon the latter occurrence, the primary and pilot valve mandrels move in unison, as designated by the arrow lines thereon in FIG. 6, to a position wherein their composite length is centered relative to the flux gap 66. Upon the latter occurrence, due to the proportioning of the mandrels 78 and 80 relative to the valve body 40, the mandrel 78 is maintained in a position completely laterally of the flow path between the interior of the leg 46 and the opening 54. It is because of this characteristic that a large unrestricted flow path may be provided while employing a valve body of simple T-shaped configuration. The curved arrow line in FIG. 6 extending between the interior of the leg 46 and the opening 54 is intended to diagrammatically illustrate the general flow pattern.

After the valve 24 is opened, as illustrated in FIG. 6, and oil is completely discharged from the tank 22, de-energizing of the solenoid coil 34 will permit the mandrels 78 and 80 to move downwardly under the influence of the spring 82. If the primary lubrication system of the engine 10 is under full pressure at this time, the differential in pressure across the mandrel 78 will maintain it in open condition until the tank 22 is again filled with oil under pressure. On completion of the latter occurrence, the valve 78 will close under the influence of the spring 82 in the same manner as it did after initial charging of the tank. If, for some reason, the primary lubrication system of the engine is not under pressure after full discharge of the tank 22 and de-energizing of the solenoid winding 34, the mandrels 78 and 80 will simply move to the closed condition illustrated in FIG. 2 under the influence of the spring 82. In this event, charging of the tank 22 will be effected on the next occurrence of operating pressure in the primary lubrication system of the engine. This charging will be effected in a manner identical to the aforedescribed initial charging of the tank 22.

Once the tank is recharged, it is again in condition to be discharged through the aforedescribed sequence of valve operation illustrated in FIGS. 5 and 6. After each discharging, the tank 22 will automatically recharge as described in the foregoing discussion upon the creation of operating pressure in the primary lubrication system of the engine by the pump 16. Thus, whenever the engine is run after discharging of the tank 22, the auxiltary lubrication system will be returned to a condition preparatory for supplying oil under pressure to the engine prior to starting.

From the foregoing detailed description, it is believed apparent that the present invention enables the attainment of the objects initially set forth herein. It is to be understood, however, that the invention is not intended to be limited to the details of the specific embodiment herein illustrated and described. For example, it is anticipated that the valve 24 may be inverted from the position illustrated to facilitate movement of the primary valve mandrel 78 under the influence of gravity, even when a pressure differential does not exist thereacross upon lifting of the pilot valve mandrel 78 from the seat 88.

What is claimed is:
1. A pressure differential valve, comprising:
 (a) a substantially rectilinear tubular element comprised of contiguous first and second lengths, at least the first of which is formed of non-magnetic material;
 (b) means closing said first length at the distal end thereof;
 (c) a solenoid winding surrounding said first length and terminating short of said second length;

(d) first conduit connecting means at the distal end of said second length adapted to establish sealed fluid communication between the interior of said second length and a first fluid conduit external thereof;

(e) second conduit connecting means in said second length between the distal end thereof and said first length adapted to establish fluid communication between the interior of said second length and a second fluid conduit external thereof;

(f) a valve seat in said second length intermediate said first and second conduit connecting means;

(g) primary valve mandrel means of magnetic material received in said element for slidable movement within said first and second lengths, said primary mandrel means being:
  (1) engageable at one end thereof with said seat to sealingly isolate said first conduit connecting means from fluid communication with said second conduit connecting means through said second length;
  (2) of a length such that, when said one end is engaged with said valve seat, the end thereof opposite said one end terminates within a portion of said second length disposed between said second conduit connecting means and said first length; and,
  (3) of a cross section, measured transverse to the length thereof, to restrict fluid flow therearound to said first length from said second length to a predetermined degree;

(h) conduit means extending through said primary valve mandrel means between said one end thereof engageable with said seat and the end thereof opposite said one end, said means being:
  (1) adapted to establish fluid communication between a first fluid conduit in fluid communication with said first conduit connecting means and the interior of said first length when said mandrel means is engaged with said seat; and,
  (2) of an internal area adapted to restrict fluid flow therethrough to a predetermined degree less than the degree to which fluid flow is restricted around said mandrel means;

(i) pilot valve mandrel means of magnetic material received in said element for slidable movement within said first length, said pilot mandrel means being:
  (1) engageable with said conduit means to sealingly isolate said means from fluid communication with said first length; and,
  (2) moveably responsive to energizing of said solenoid winding to a position opening said conduit means to fluid communication with said first length and permitting said primary valve mandrel means to move, at least partially, into said first length and within the physical confines of the solenoid winding therearound.

2. A pressure differential valve according to claim 1, wherein:
  (a) said first conduit connecting means comprises an opening in the distal end of said second length;
  (b) said second conduit means comprises a port opening through the side of said second length; and,
  (c) said element and said primary and pilot valve means are so proportioned relative to each other and said port is so orientated as to permit both of said mandrel means to move towards the distal end of said first length to a position wherein said primary mandrel means is disposed laterally of said port so as to provide an unrestricted flow path through said second length between said opening and port.

3. A pressure differential valve according to claim 1, wherein:

(a) said element is formed of an integral tube of substantially uniform internal diameter over said first and second lengths; and,
(b) said second conduit connecting means comprises a conduit joined to said second length to define a T-joint therewith.

4. A pressure differential valve according to claim 1 further comprising resilient compression means interposed between said means closing said first length and said pilot valve mandrel means to normally urge said mandrel means into engagement with said conduit means, said compression means being:
  (a) of insufficient strength to prevent said pilot valve mandrel means from moving out of engagement with said conduit means responsive to energizing of said solenoid winding; and,
  (b) of sufficient strength to urge said primary valve mandrel means, through the application of force thereto through said pilot valve mandrel means, into engagement with said valve seat upon de-energizing of said solenoid winding and equalization of fluid pressure on opposite sides of said primary valve mandrel means.

5. A pressure differential valve according to claim 1 further comprising a flux guide operatively associated with said solenoid winding to guide the flux thereof so that maximum pulling force therefrom is imparted centrally of the length of the winding and wherein the pilot valve means is proportioned so that the end thereof opposite that engageable with the conduit means is, upon engagement of said primary valve mandrel means with said seat and engagement of said pilot valve mandrel means with said conduit means, disposed substantially centrally of the length of said winding.

6. A pressure differential valve according to claim 1 wherein said valve seat is of annular configuration and said conduit means includes an extension adapted, upon engagement of said primary valve mandrel means with said seat, to extend through said seat.

7. A pressure differential valve according to claim 4 wherein, to establish a delay in the time required for said primary valve mandrel means to move into engagement with said valve seat responsive to said compression means:
  (a) the cross section of said primary valve mandrel means is sufficient to restrict fluid flow past said mandrel means, when said pilot valve mandrel means is engaged with said conduit means, to a degree retarding movement of said pilot and primary valve mandrel means responsive to said resilient compression means; and,
  (b) said respective valve mandrel means and said first and second lengths are so proportioned relative to each other that said primary valve mandrel means must move through an elongated path within the tubular element, upon de-energizing of said solenoid winding, to assume engagement with said valve seat.

References Cited

UNITED STATES PATENTS

| | | | |
|---|---|---|---|
| 1,954,804 | 4/1934 | Doble | 251—44 X |
| 2,755,787 | 7/1956 | Butler et al. | 123—196 |
| 3,100,103 | 8/1963 | Bullard | 251—30 |

FOREIGN PATENTS 837,899 6/1960 Great Britain.

M. CARY NELSON, *Primary Examiner.*

ARNOLD ROSENTHAL, *Assistant Examiner.*